US009485812B2

(12) United States Patent
Saiki et al.

(10) Patent No.: US 9,485,812 B2
(45) Date of Patent: Nov. 1, 2016

(54) HIGH FREQUENCY HEATING COIL

(75) Inventors: Masao Saiki, Wako (JP); Hiroyuki Yamashita, Wako (JP); Yosihide Oti, Higashikurume (JP)

(73) Assignee: HONDA MOTOR CO., LTD., Tokyo (JP)

( * ) Notice: Subject to any disclaimer, the term of this patent is extended or adjusted under 35 U.S.C. 154(b) by 970 days.

(21) Appl. No.: 13/808,416

(22) PCT Filed: Jun. 8, 2011

(86) PCT No.: PCT/JP2011/063147
§ 371 (c)(1),
(2), (4) Date: Mar. 22, 2013

(87) PCT Pub. No.: WO2012/005076
PCT Pub. Date: Jan. 12, 2012

(65) Prior Publication Data
US 2013/0175260 A1 Jul. 11, 2013

(30) Foreign Application Priority Data

Jul. 8, 2010 (JP) ................................. 2010-155866

(51) Int. Cl.
*H05B 6/40* (2006.01)
*C21D 1/10* (2006.01)
(Continued)

(52) U.S. Cl.
CPC ........ *H05B 6/40* (2013.01); *C21D 1/10* (2013.01); *C21D 1/42* (2013.01); *C21D 1/667* (2013.01);
(Continued)

(58) Field of Classification Search
CPC .......... C21D 1/10; C21D 1/42; C21D 1/667; C21D 9/085; C21D 9/40; C21D 9/32; H05B 6/101; H05B 6/362; H05B 6/40; Y02P 10/253
See application file for complete search history.

(56) References Cited

U.S. PATENT DOCUMENTS 2,408,229 A 9/1946 Roberds
2,477,118 A 7/1949 Detuno
(Continued)

FOREIGN PATENT DOCUMENTS

CN 1484472 3/2004
CN 1771764 5/2006
(Continued)

OTHER PUBLICATIONS

Chinese Office Action dated Aug. 23, 2013, 6 pages.
(Continued)

*Primary Examiner* — Jianying Atkisson
(74) *Attorney, Agent, or Firm* — Rankin, Hill & Clark LLP

(57) ABSTRACT

A high frequency heating coil is provided in which a main body part of a workpiece is surrounded by a loop part of the high frequency heating coil and subjected to high frequency heating, and a flange part of the workpiece is sandwiched by first and second lead-out parts of the high frequency heating coil and subjected to high frequency heating. The first and second lead-out parts oppose the flange part and are offset in the axial direction of the workpiece, thereby preventing eddy currents in opposite directions to each other from being generated in the flange part and preventing the flange part from being more difficult to heat than the main body part. The high frequency heating coil can uniformly heat a pipe-shaped workpiece having a flange part projecting radially outward from an outer peripheral face of a main body part.

4 Claims, 5 Drawing Sheets

(51) Int. Cl.
*C21D 1/42* (2006.01)
*C21D 1/667* (2006.01)
*C21D 9/08* (2006.01)
*C21D 9/40* (2006.01)
*H05B 6/10* (2006.01)
*H05B 6/36* (2006.01)
*C21D 9/32* (2006.01)

(52) U.S. Cl.
CPC ............... *C21D 9/085* (2013.01); *C21D 9/40* (2013.01); *H05B 6/101* (2013.01); *H05B 6/362* (2013.01); *C21D 9/32* (2013.01); *Y02P 10/253* (2015.11)

(56) References Cited

U.S. PATENT DOCUMENTS 2,481,071 A  9/1949  Bowlus
7,442,906 B2  10/2008  Tanaka et al.

FOREIGN PATENT DOCUMENTS

| | | |
|---|---|---|
| CN | 101132938 | 2/2008 |
| CN | 101142854 | 3/2008 |
| CN | 101438620 | 5/2009 |
| EP | 0977465 | 2/2000 |
| GB | 621081 | 4/1949 |
| JP | S56139622 | 10/1981 |
| JP | 2006-240441 | 9/2006 |
| JP | 2008-053010 | 3/2008 |
| JP | 4198715 | 10/2008 |

OTHER PUBLICATIONS

Partial Supplementary European Search Report dated Jan. 17, 2014, 2 pages.
Curtis, F.W. "High-Frequency Induction Heating", 1950, McGraw-Hill Book Co., NY, United States, p. 102, 103, 151, 286, 303; 5 pages.
European Office Action dated Feb. 10, 2015, 3 pages.

(CONVENTIONAL EXAMPLE)

HIGH FREQUENCY HEATING COIL

TECHNICAL FIELD

The present invention relates to a high frequency heating coil that, in order to subject to high frequency heating a pipe-shaped workpiece having formed along an axial direction a flange part projecting outward in a radial direction from an outer peripheral face of a main body part having a closed cross section, includes a loop part that surrounds the main body part and a pair of lead-out parts that extend outward in the radial direction from opposite ends close to each other in an axial direction of the loop part and face opposite faces of the flange part.

BACKGROUND ART

An arrangement in which a door impact bar for protecting an occupant from the impact of a side collision by reinforcing an automobile door is curved into a predetermined shape while heating low strength straight steel pipe by means of a high frequency heating coil and then subjected to a hardening process by spraying cooling water so as to rapidly cool it, thus working it into a desired shape and strength, is known from Patent Document 1 below.

RELATED ART DOCUMENTS

Patent Documents

Patent Document 1: Japanese Patent No. 4198715

SUMMARY OF THE INVENTION

Problems to be Solved by the Invention

When a workpiece that is heated by means of a high frequency heating coil is for example a pipe-shaped member roll-formed from a metal plate material, a flange part is formed along the axial direction in a portion where opposite side edges of the metal plate material are overlapped, the flange part projecting outward in the radial direction from an outer peripheral face of a main body part of the workpiece. Furthermore, a pair of lead-out parts connected to a high frequency power supply are provided at opposite ends of a loop part of the high frequency heating coil that surrounds the main body part of the workpiece, and this pair of lead-out parts are disposed along opposite faces of the flange part of the workpiece, thus heating the flange part of the workpiece.

However, as is explained later by reference to FIG. 5, when the pair of lead-out parts of the high frequency heating coil that sandwich the flange part of the workpiece are disposed in a straight line and in parallel, due to eddy currents generated in the flange part by the pair of lead-out parts canceling each other out, compared with the main body part of the workpiece, it becomes more difficult to heat the flange, and there is a possibility that the quality of the bending and hardening processes will be degraded.

The present invention has been accomplished in light of the above-mentioned circumstances, and it is an object thereof to provide a high frequency heating coil that can uniformly heat a pipe-shaped workpiece in which a flange part projecting outward in the radial direction from an outer peripheral face of a main body part having a closed cross section is formed along the axial direction.

Means for Solving the Problems

In order to attain the above object, according to a first aspect of the present invention, there is provided a high frequency heating coil, in order to subject to high frequency heating a pipe-shaped workpiece having formed along an axial direction thereof a flange part projecting outward in a radial direction from an outer peripheral face of a main body part having a closed cross section, the high frequency heating coil comprising a loop part that surrounds the main body part and a pair of lead-out parts that extend outward in the radial direction from opposite ends close to each other in an axial direction of the loop part and face opposite faces of the flange part, characterized in that the pair of lead-out parts are offset from each other toward opposite sides in the axial direction.

Further, according to a second aspect of the present invention, in addition to the first aspect, the pair of lead-out parts are curved into a U-shape, a V-shape, or a squared U-shape.

Furthermore, according to a third aspect of the present invention, in addition to the second aspect, the pair of lead-out parts (14, 15) form a loop when viewed from a direction at right angles to the axis.

Moreover, according to a fourth aspect of the present invention, in addition to any one of the first to third aspects, the workpiece is formed by curving a metal plate material into a pipe shape, and the flange part is formed by overlapping a pair of side edges of the metal plate material.

Further, according to a fifth aspect of the present invention, in addition to any one of the first to fourth aspects, an eddy current induced by a high frequency current passing through the loop part flows so as to go around in the main body part of the workpiece, and an eddy current induced by a high frequency current passing through the pair of lead-out parts flows so as to go around within the plane of the flange part of the workpiece.

First and second lead-out parts 14 and 15 of an embodiment correspond to the lead-out part of the present invention.

Effects of the Invention

In accordance with the first aspect of the present invention, the main body part of the workpiece is surrounded by the loop part of the high frequency heating coil and subjected to high frequency heating, and the flange part of the workpiece is sandwiched by the pair of lead-out parts of the coil and subjected to high frequency heating. The pair of lead-out parts of the high frequency heating coil oppose the flange part of the workpiece, and since the pair of lead-out parts are disposed so as to be offset in the axial direction of the workpiece, it is possible to prevent eddy currents in opposite directions to each other from being generated in the flange part of the workpiece by means of high frequency current passing through the pair of lead-out parts, thereby preventing the flange part of the workpiece from being more difficult to heat compared with the main body part.

Furthermore, in accordance with the second aspect of the present invention, since the pair of lead-out parts of the high frequency heating coil are curved into a U-shape, V-shape, or squared U-shape, the pair of lead-out parts can be offset effectively by simple processing.

Moreover, in accordance with the third aspect of the present invention, since the pair of lead-out parts form a loop when viewed in a direction at right angles to the axis, not only is it possible to generate an eddy current flowing within the plane of the flange part to thus enable effective heating, but it is also possible to facilitate fixing and wiring of the high frequency heating coil by aligning the axial heights of end parts of the pair of lead-out parts.

Furthermore, in accordance with the fourth aspect of the present invention, since the workpiece is a metal plate material curved into a pipe shape and the flange part is formed by overlapping a pair of side edges of the metal plate material, the thickness of the flange part is twice the thickness of the main body part, and it is more difficult for it to be heated, but since the pair of lead-out parts are disposed offset in the axial direction of the workpiece, it is possible to sufficiently heat the flange part, which is difficult to heat.

Moreover, in accordance with the fifth aspect of the present invention, since an eddy current induced by high frequency current passing through the loop part flows so as to go around in the main body part of the workpiece, the heating effect on the main body part is enhanced, and since an eddy current induced by high frequency current passing through the pair of lead-out parts flows so as to go around within the plane of the flange part of the workpiece, the heating effect on the flange part is enhanced.

EXPLANATION OF REFERENCE NUMERALS AND SYMBOLS

W Workpiece
11 Main body part
12 Flange part
13 Loop part
14 First lead-out part (lead-out part)
15 Second lead-out part (lead-out part)

MODE FOR CARRYING OUT THE INVENTION

Figure 1:
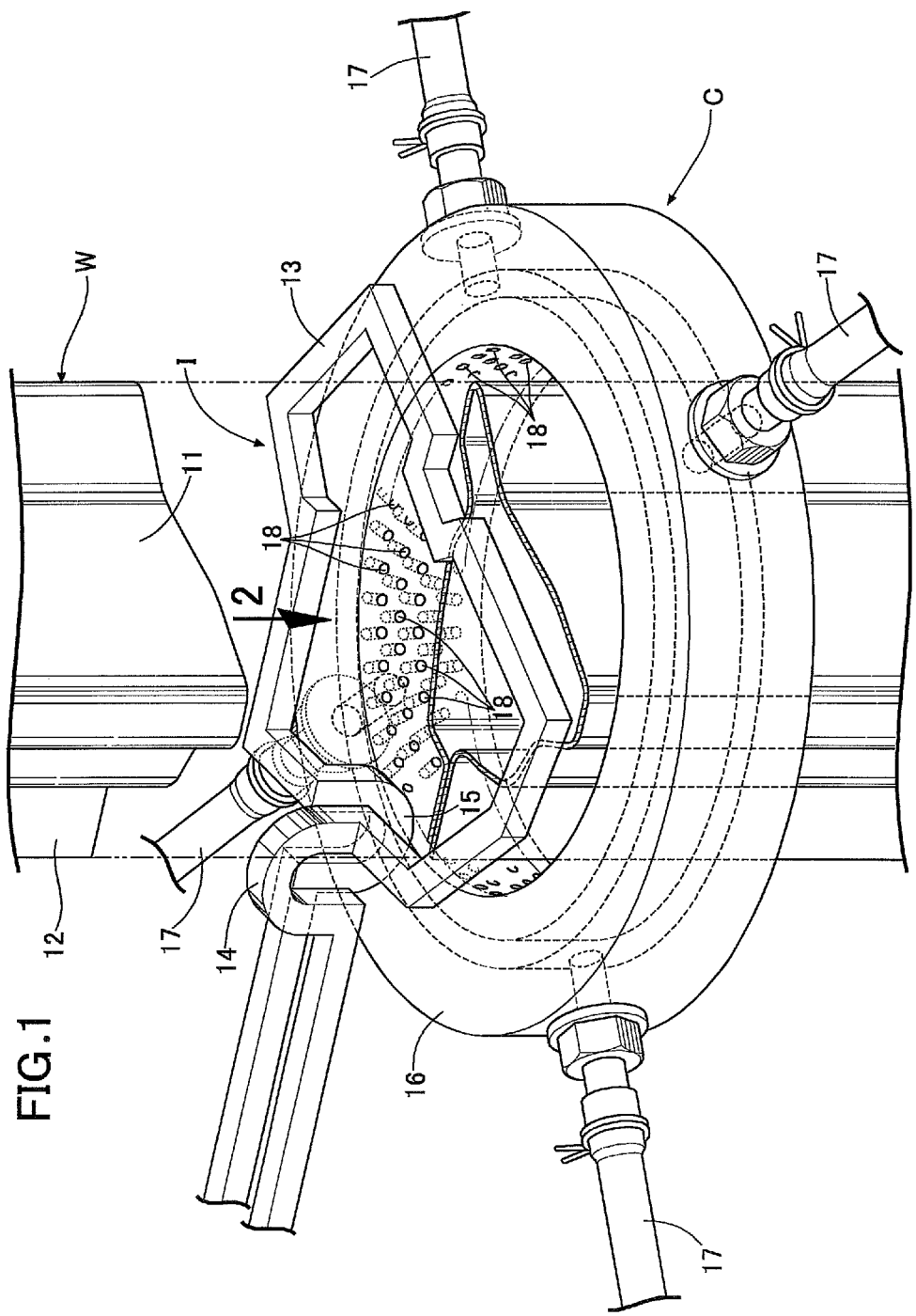
FIG. 1 is a perspective view of a high frequency hardening device. (first embodiment)
Figure 2:
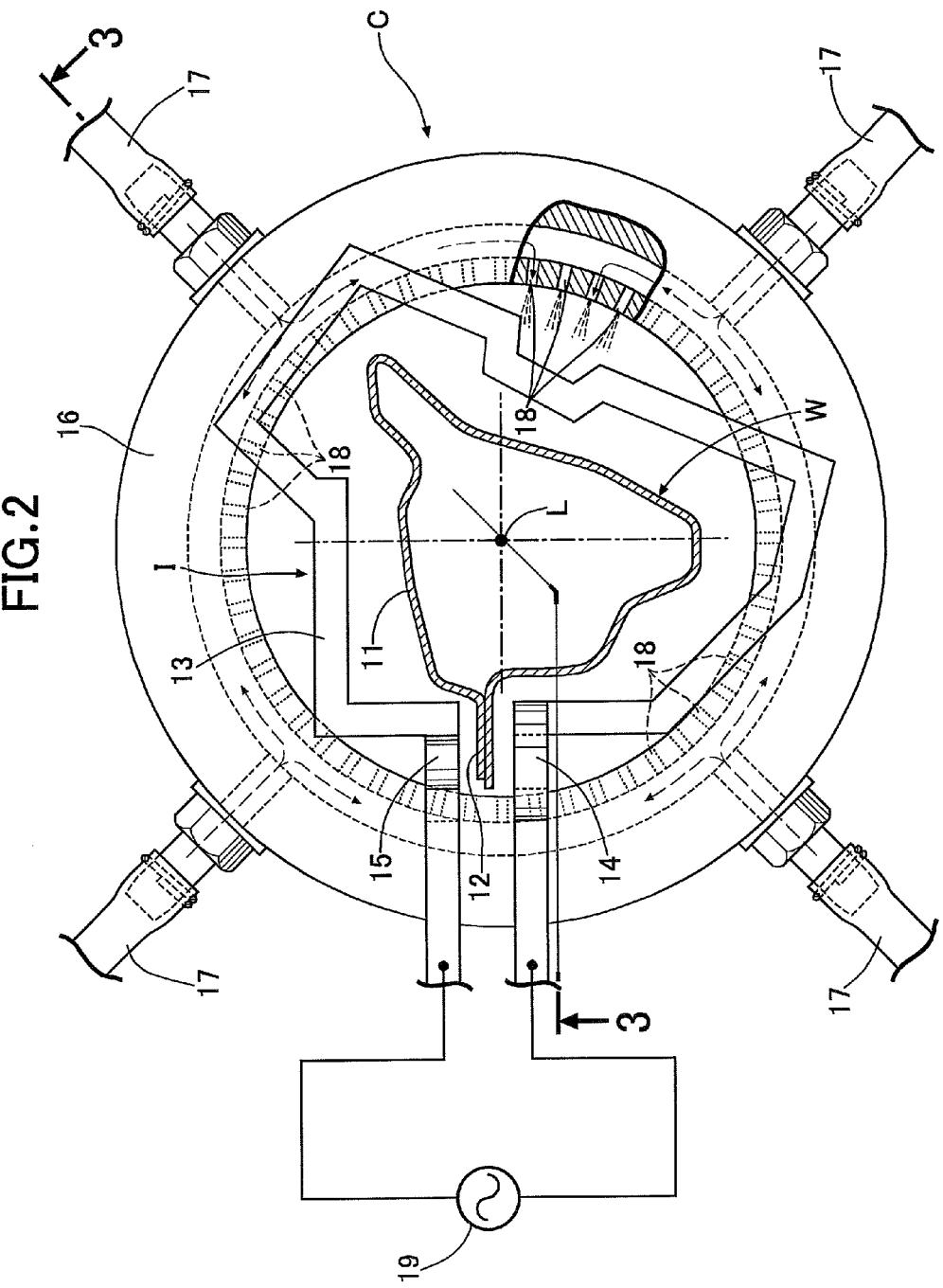
FIG. 2 is a view from arrow 2 in FIG. 1. (first embodiment)
Figure 3:
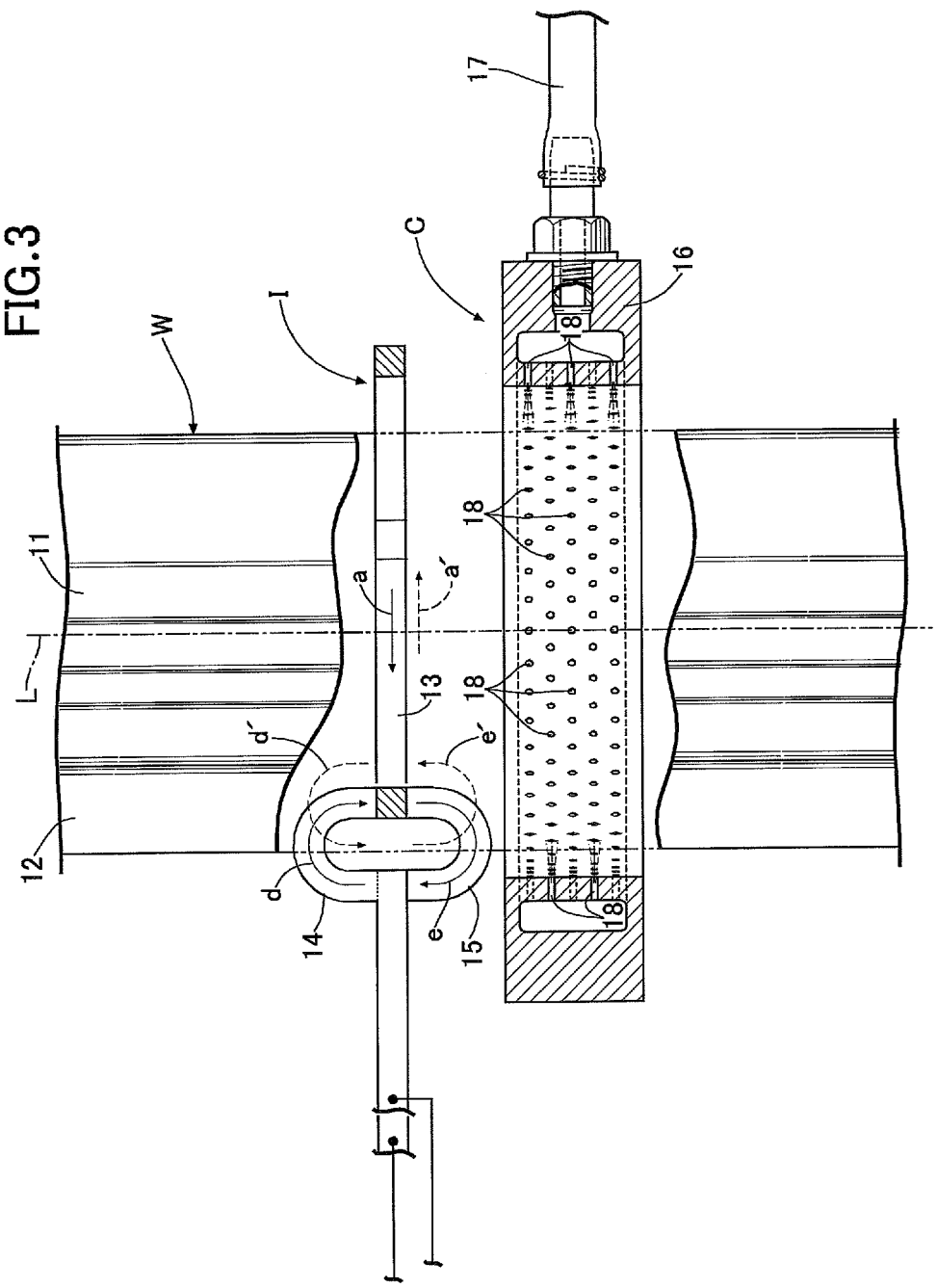
FIG. 3 is a sectional view along line 3-3 in FIG. 2. (first embodiment)

A first embodiment of the present invention is explained below by reference to FIG. 1 to FIG. 3.
First Embodiment As shown in FIG. 1 to FIG. 3, a workpiece W of the present embodiment is for example a member integrally forming a roof side rail and a front pillar of an automobile, and includes a main body part 11 having a closed cross section formed by roll-forming a steel sheet into a pipe shape, and a flange part 12 formed by overlapping opposite side edges of the steel sheet, the flange part 12 projecting in the radial direction from an outer peripheral face of the main body part 11 and extending along the direction of an axis L of the workpiece W (see FIG. 2 and FIG. 3). The roll-formed workpiece W is a straight member having a fixed cross section along the axial direction, and is curved into a predetermined shape by heating by means of a high frequency heating coil I and applying an external force and then subjected to hardening by rapidly cooling with cooling water.

The high frequency heating coil I includes a loop part 13 with one turn that surrounds the outer periphery of the main body part 11 of the workpiece W across a predetermined gap, and first and second lead-out parts 14 and 15 that extend from opposite ends of the loop part 13 outward in the radial direction and face opposite faces of the flange part 12 of the workpiece W across a predetermined gap. The loop part 13 is a two-dimensional shape that curves within the same plane, and the loop is partially interrupted between opposite ends of the loop part 13. Among the first and second lead-out parts 14 and 15 connected to the opposite ends of the loop part 13, the first lead-out part 14 is formed into a U-shape and projects upward in the axial direction, and the second lead-out part 15 is formed into a U-shape and projects downward in the axial direction, the first and second lead-out parts 14 and 15 thereby being offset from each other in the axial direction. When the first and second lead-out parts 14 and 15 are viewed in a direction at right angles to the axis of the workpiece W (see FIG. 3), the two form in cooperation an oval shape or a racetrack shape.

A cooling device C disposed adjacent to the high frequency heating coil I includes an annular cooling water tank 16, four cooling water supply pipes 17 connected to an outer peripheral face of the cooling water tank 16, and a large number of cooling water spray holes 18 formed on an inner peripheral face of the cooling water tank 16.

The operation of a mode for carrying out the present invention having the above-mentioned arrangement is now explained.

The workpiece W is inserted through the interiors of the high frequency heating coil I and the cooling device C, and is heated by the high frequency heating coil I while moving it in the axial direction at a predetermined speed. In this process, the main body part 11 of the workpiece W is fitted into the interior of the loop part 13 of the high frequency heating coil I, and the flange part 12 of the workpiece W is sandwiched between the first and second lead-out parts 14 and 15 of the high frequency heating coil I. When a high frequency current is supplied from a high frequency power supply 19 (see FIG. 2) to the high frequency heating coil I, an eddy current is generated in the interior of the workpiece W by virtue of the magnetic field formed around the high frequency heating coil I, and the workpiece W is heated by Joule heating.

In particular, as shown in FIG. 3, a current a passing through the loop part 13 of the high frequency heating coil I surrounding the outer periphery of the main body part 11 of the workpiece W generates therein an eddy current a' that is in the reverse direction, and since this eddy current a' passes so as to go around in the main body part 11 having a closed cross section of the workpiece W, it is possible to heat the main body part 11 of the workpiece W efficiently.

In this way, the workpiece W is heated by the high frequency heating coil I while moving the workpiece W at a predetermined speed in the axial direction, at the same time a bending moment is applied so as to curve it into a predetermined shape, and the workpiece W is then rapidly cooled by means of cooling water sprayed from the cooling water spray holes 18 of the cooling device C so as to carry out hardening, thus making it possible to carry out bending and hardening processes of the workpiece W continuously.

Figure 5:
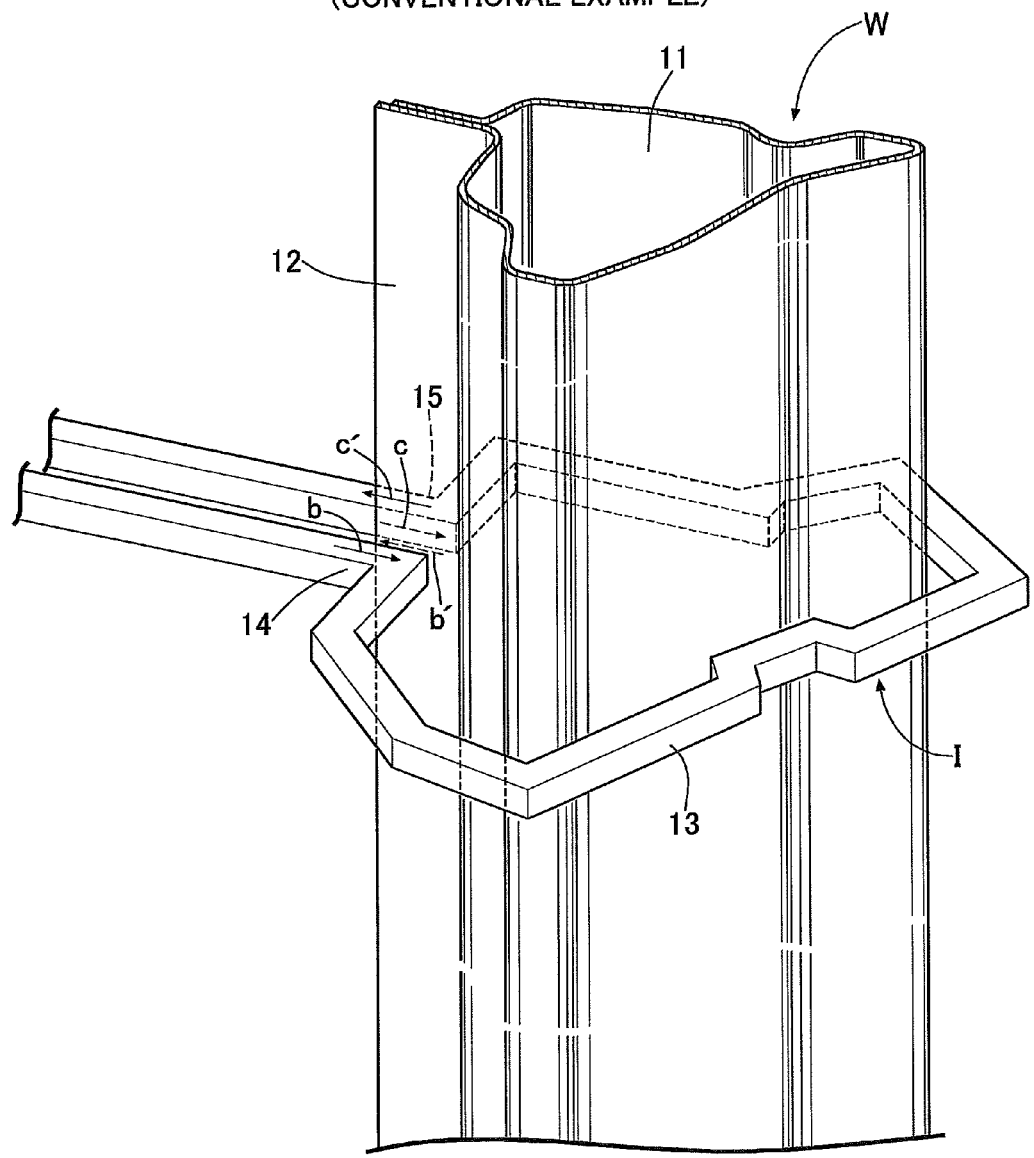
FIG. 5 is a perspective view of a high frequency heating coil. (conventional example)

In a conventional high frequency heating coil I shown in FIG. 5, since a pair of first and second lead-out parts 14 and 15 are disposed in a straight line and in parallel so as to sandwich a flange part 12 of a workpiece W, an eddy current b' generated by a current b passing through the first lead-out part 14 and an eddy current c' generated by a current c passing through the second lead-out part 15 flow through the interior of the flange part 12 of the workpiece W at the same level but in opposite directions to each other, and the two eddy currents b' and c' cancel each other out. As a result, compared with a main body part 11 of the workpiece W, the temperature of the flange part 12 does not increase sufficiently, and there is a possibility that the quality of bending and hardening processes of the workpiece W will be degraded.

In contrast thereto, in accordance with the present embodiment, since the first and second lead-out parts 14 and 15 of the high frequency heating coil I are offset in the vertical direction so that they do not oppose to each other with the flange part 12 of the workpiece W sandwiched therebetween, as shown in FIG. 3 the flange part 12 can be heated efficiently by preventing an eddy current d' generated by a current d passing through the first lead-out part 14 and an eddy current e' generated by a current e passing through the second lead-out part 15 from canceling each other out.

In particular, when viewed from a direction at right angles to the axis L of the workpiece W (see FIG. 3), since the first and second lead-out parts 14 and 15 form in cooperation one closed loop, the currents d and e passing therethrough make the closed eddy currents d' and e' flow within the plane of the flange part 12 in opposite directions thereto, and the surface of the flange part 12 can be heated effectively. Moreover, since the first and second lead-out parts 14 and 15 are curved into a U-shape, it is possible to offset the first and second lead-out parts 14 and 15 effectively by a simple process, and the first and second lead-out parts 14 and 15 can form in cooperation one closed loop.

Furthermore, since the workpiece W is formed by curving a metal plate material into a pipe shape and the flange part 12 is formed by overlapping a pair of side edges of the metal plate material, the thickness of the flange part 12 is twice the thickness of the main body part 11 and is more difficult to heat. However, since the heating effect on the flange part 12 of the workpiece W by means of the first and second lead-out parts 14 and 15 can be enhanced as described above, it is possible to uniformly heat the main body part 11 and the flange part 12 of the workpiece W.

Figure 4:
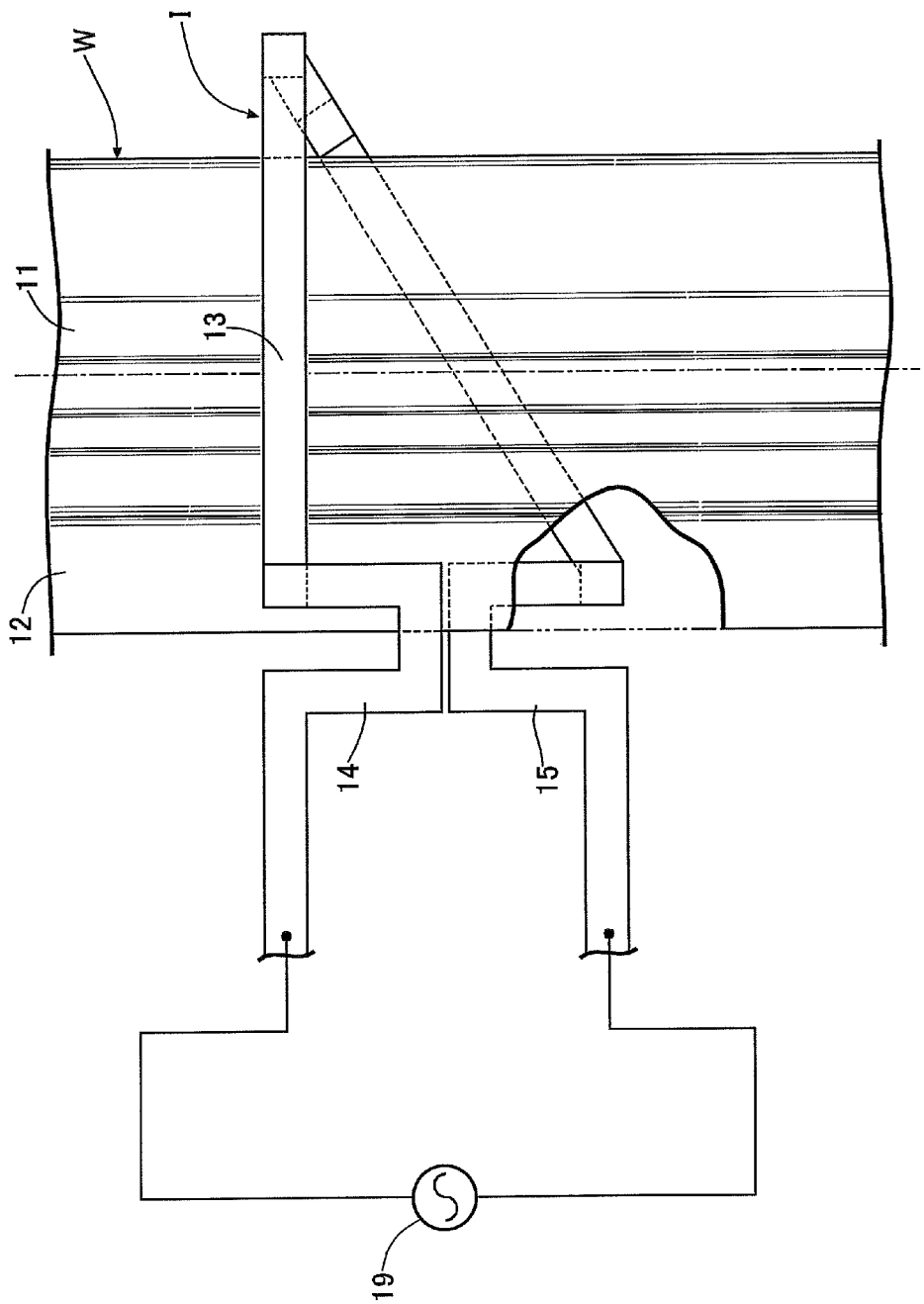
FIG. 4 is a view corresponding to FIG. 3. (second embodiment)

A second embodiment of the present invention is now explained by reference to FIG. 4.

Second Embodiment

In the high frequency heating coil I of the first embodiment, the first and second lead-out parts 14 and 15 extend in a U-shape from the same position in the axial direction of the workpiece W in directions that move away from each other, but in a high frequency heating coil I of the second embodiment, first and second lead-out parts 14 and 15 extend in a squared U-shape in directions that approach each other from two positions that are slightly spaced in the axial direction of a workpiece W. In addition, the first and second lead-out parts 14 and 15 are disposed so as not to overlap one another when viewed from a direction at right angles to an axis L of the workpiece W.

In accordance with this second embodiment, it is possible to prevent eddy currents generated in the flange part 12 of the workpiece W by means of currents passing through the first and second lead-out parts 14 and 15 from canceling each other out, thereby heating the flange part 12 in the same manner as in the first embodiment.

Modes for carrying out the present invention are explained above, but the present invention may be modified in a variety of ways as long as the modifications do not depart from the spirit and scope thereof.

For example, in the embodiments, the number of turns of the high frequency heating coil I is one turn, but there may be a plurality of turns. However, when the high frequency heating coil I is turned a plurality of times into a coil shape and the positions of the first and second lead-out parts 14 and 15 are greatly displaced from each other in the axial direction, the problem of the present invention will not occur in the first place; the positions of the first and second lead-out parts 14 and 15 being close to each other in the axial direction is a prerequisite of the present invention.

Furthermore, the first and second lead-out parts 14 and 15 of the first embodiment are curved into a U-shape, and the first and second lead-out parts 14 and 15 of the second embodiment are curved into a squared U-shape, but the same operational effects can be achieved by ones curved into a V-shape.

Moreover, the high frequency heating coil I of the present invention is not limited to application in a hardening process, and may be applied to heating for any purpose.

The invention claimed is:

1. A high frequency heating coil, in order to subject to high frequency heating a pipe-shaped workpiece, the pipe-shaped workpiece being formed to extend along an axis of the workpiece and comprising a main body part and a flange part, the main body part having a closed cross section, and the flange part being formed along an axial direction of the workpiece and projecting outward in a radial direction from an outer peripheral face of the main body part, the high frequency heating coil comprising a loop part that surrounds the main body part and a pair of lead-out parts that extend outward radially along the flange part from opposite ends of the loop part which are located close to each other in a direction along the axis of the workpiece and face opposite side faces of the flange part,
   wherein the pair of lead-out parts are offset from each other toward opposite sides in the axial direction of the workpiece,
   wherein the pair of lead-out parts are curved into a U-shape, a V-shape, or a squared U-shape, and
   wherein the pair of lead-out parts form a loop when viewed from a direction at right angles to the axis.

2. The high frequency heating coil according to claim 1, wherein the workpiece is formed by curving a metal plate material into a pipe shape, and the flange part is formed by overlapping a pair of side edges of the metal plate material.

3. The high frequency heating coil according to claim 1, wherein an eddy current induced by a high frequency current passing through the loop part flows so as to go around in the main body part of the workpiece, and an eddy current induced by a high frequency current passing through the pair of lead-out parts flows so as to go around within a plane of the flange part of the workpiece.

4. The high frequency heating coil according to claim 2, wherein an eddy current induced by a high frequency current passing through the loop part flows so as to go around in the main body part of the workpiece, and an eddy current induced by a high frequency current passing through the pair of lead-out parts flows so as to go around within the plane of the flange part of the workpiece.

* * * * *